No. 726,775. PATENTED MAY 12, 1903.
J. H. SHEARN.
SKEINING MACHINE.
APPLICATION FILED OCT. 31, 1901.

NO MODEL. 10 SHEETS—SHEET 1.

Witnesses:
J. W. Garfield
H. I. Clemons

Inventor:
Joseph H. Shearn.
by Chapin & Co.
Attorneys.

No. 728,775. PATENTED MAY 19, 1903.
J. H. SHEARN.
SKEINING MACHINE.
APPLICATION FILED OCT. 31, 1901.
NO MODEL. 10 SHEETS—SHEET 2.

No. 728,775. PATENTED MAY 19, 1903.
J. H. SHEARN.
SKEINING MACHINE.
APPLICATION FILED OCT. 31, 1901.
NO MODEL. 10 SHEETS—SHEET 4.

Fig. 5.

Witnesses:

Inventor:
Joseph H. Shearn
by Chapin Lee
Attorneys.

No. 728,775. PATENTED MAY 19, 1903.
J. H. SHEARN.
SKEINING MACHINE.
APPLICATION FILED OCT. 31, 1901.
NO MODEL. 10 SHEETS—SHEET 5.

No. 728,775. PATENTED MAY 19, 1903.
J. H. SHEARN.
SKEINING MACHINE.
APPLICATION FILED OCT. 31, 1901.
NO MODEL. 10 SHEETS—SHEET 6.

Fig. 9.

Witnesses:

Inventor:
Joseph H. Shearn
by Chapin & Co
Attorneys.

THE NORRIS PETERS CO., PHOTO-LITHO., WASHINGTON, D. C.

No. 728,775. PATENTED MAY 19, 1903.
J. H. SHEARN.
SKEINING MACHINE.
APPLICATION FILED OCT. 31, 1901.
NO MODEL. 10 SHEETS—SHEET 7.

Fig. 10.

No. 728,775. PATENTED MAY 19, 1903.
J. H. SHEARN.
SKEINING MACHINE.
APPLICATION FILED OCT. 31, 1901.
NO MODEL. 10 SHEETS—SHEET 8.

Fig. 11.

No. 728,775. PATENTED MAY 19, 1903.
J. H. SHEARN.
SKEINING MACHINE.
APPLICATION FILED OCT. 31, 1901.
NO MODEL. 10 SHEETS—SHEET 10.

Witnesses:
J. D. Garfield
A. J. Clemons

Inventor:
Joseph H. Shearn
by Chapin & Co
Attorneys

No. 728,775. Patented May 19, 1903.

UNITED STATES PATENT OFFICE.

JOSEPH H. SHEARN, OF LEEDS, MASSACHUSETTS.

SKEINING-MACHINE.

SPECIFICATION forming part of Letters Patent No. 728,775, dated May 19, 1903.

Application filed October 31, 1901. Serial No. 80,664. (No model.)

*To all whom it may concern:*

Be it known that I, JOSEPH H. SHEARN, a citizen of the United States of America, residing at Leeds, in the county of Hampshire and State of Massachusetts, have invented new and useful Improvements in Skeining-Machines, of which the following is a specification.

This invention relates to machines for automatically reeling silk or other filament into skeins, the object thereof being to produce a machine of this class in which the skein may be of any desired length and in which the ends of the thread after being cut off are automatically crossed and given a turn around the skein and then knotted together.

A further object of the invention is to provide means for counting the skeins and for arresting the motion of the machine when a given number of skeins have been wound and tied, a still further object being to provide means for subjecting the tied skeins to a stretching action on the reel for straightening the strands and drawing more tightly the looped ends of the skein around the latter; and the invention consists in the various coöperating mechanisms, all as fully described in the following specification, and pointed out in the claims.

In the drawings forming part of this specification, Figure 1 is a side elevation of a machine constructed according to my invention, one of the side frames being removed and a few of the parts being shown in section. Fig. 1ª is an enlarged sectional plan view of a portion of the reel-shaft and a sliding collar thereon.

This machine consists, essentially, of a driving-shaft, (indicated by $a$,) a cam-shaft (indicated by $b$) located in the same horizontal plane as the driving-shaft $a$, and a reel-shaft $c$, these shafts $b$ and $c$ receiving their movements from the driving-shaft $a$ in the manner hereinafter described.

Figures 1, 1A:
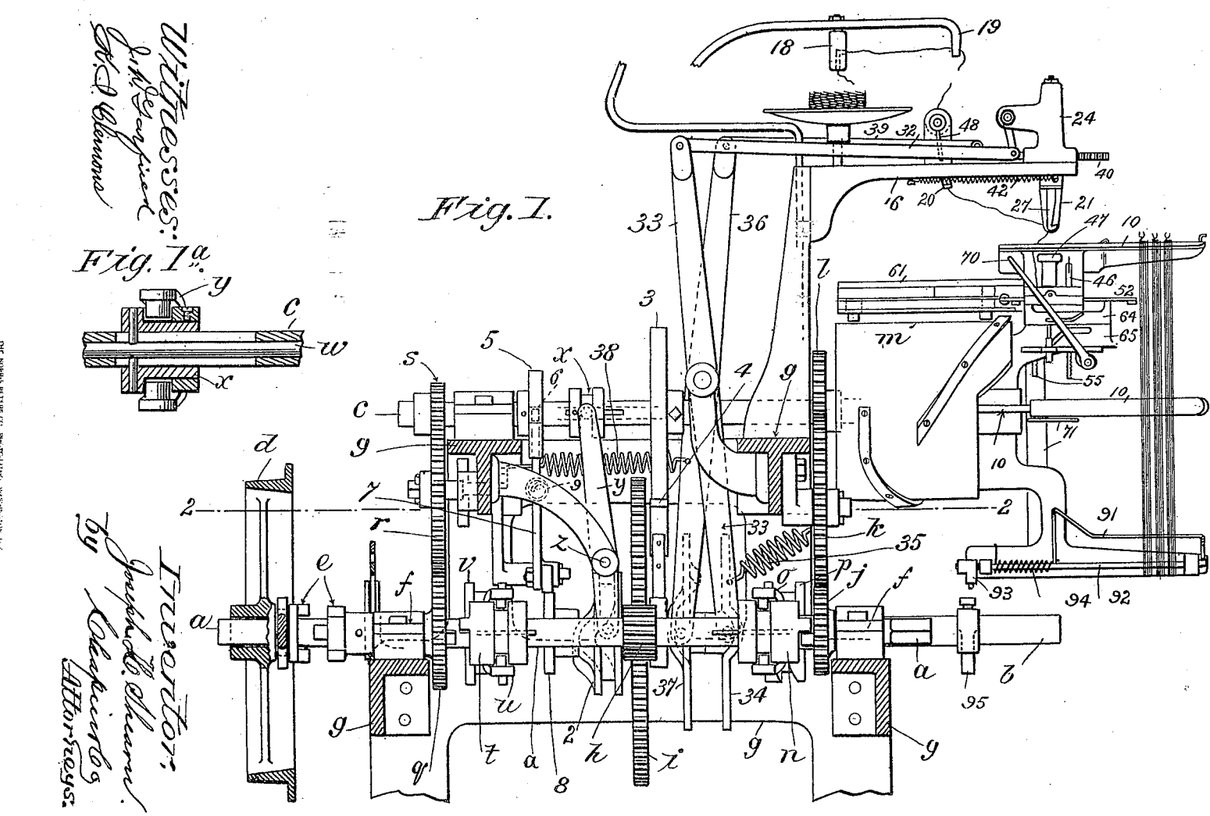

Referring now to Fig. 1, on the left-hand end of the driving-shaft $a$ there is mounted loosely thereon the driving-pulley $d$, on the hub of which are clutch projections which engage similar projections of a clutch member pinned to the driving-shaft $a$, the whole clutching device being indicated by $e$.

The shipper mechanism (shown in Fig. 3) is connected with the driving-pulley in a manner to be described hereinafter. By means of this shipping mechanism the driving-pulley $d$ (which it may be assumed is provided with its proper belt) may be moved into clutch with the driving-shaft $a$ to rotate the latter. This driving-shaft extends entirely through the machine, supported in bearings $f$, near either end thereof, the frame of the machine being indicated by $g$.

There is fixed on the driving-shaft $a$ about midway between its bearings a pinion $h$, which meshes with a large gear $i$, which is fixed on the cam-shaft $b$. Near the right-hand end of the driving-shaft $a$ is a small gear $j$, which through an intermediate gear $k$, meshing with a gear $l$, loose on the reel-shaft $c$, serves to rotate the cam-drum $m$ independently of the reel-shaft. This drum is an important factor in the knot-tying devices and the operation of which will be described in its proper place.

Operatively engaging the gear $j$ is a clutch member $n$, having a sliding movement on the driving-shaft $a$ and operated through an arm $o$, (shown in Fig. 2,) connected with the rotating cam $p$ on the shaft $b$. Whenever this clutch member $n$ is moved into engagement with the gear $j$, the cam-drum $m$ is rotated. Close to the bearing of the driving-shaft $a$, near the opposite end thereof, is another gear $q$, loose on said shaft, and through an intermediate gear $r$, which meshes with a smaller gear $s$, fixed on the reel-shaft $c$, rotates the latter.

Figures 2, 3:
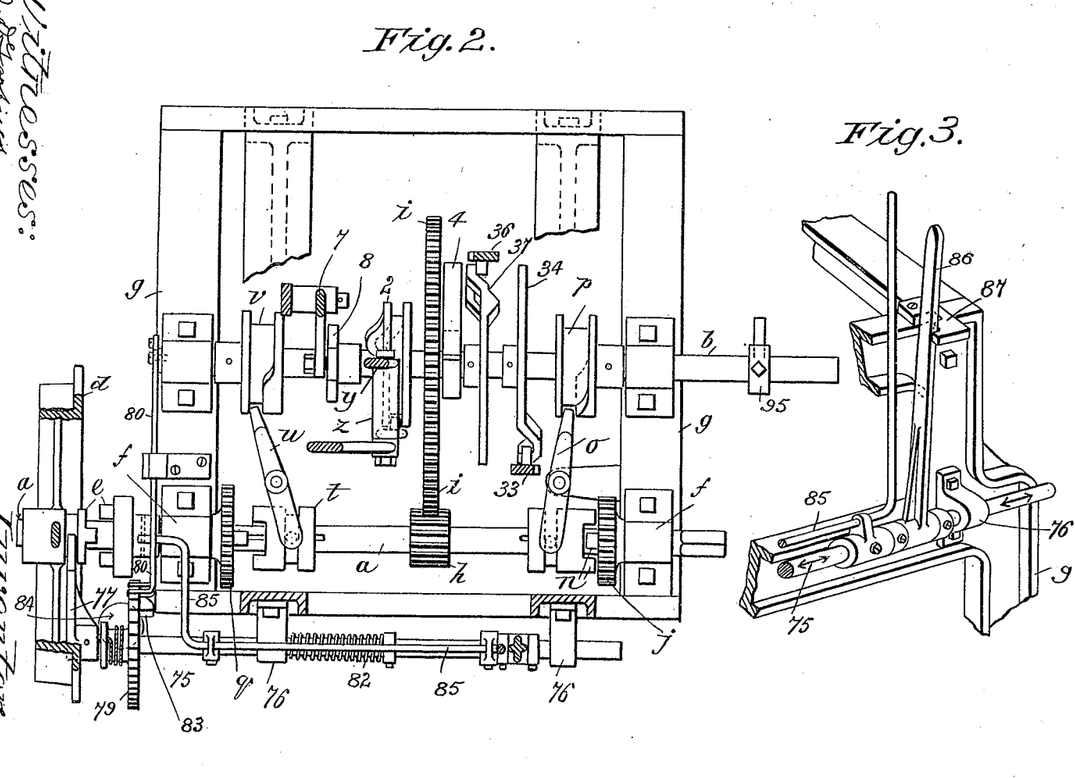
Fig. 2 is a plan view of Fig. 1, taken on line 2 2, Fig. 1.
Fig. 3 is a perspective view, on a larger scale than the preceding figures, of the shipper mechanism.
Figure 4:
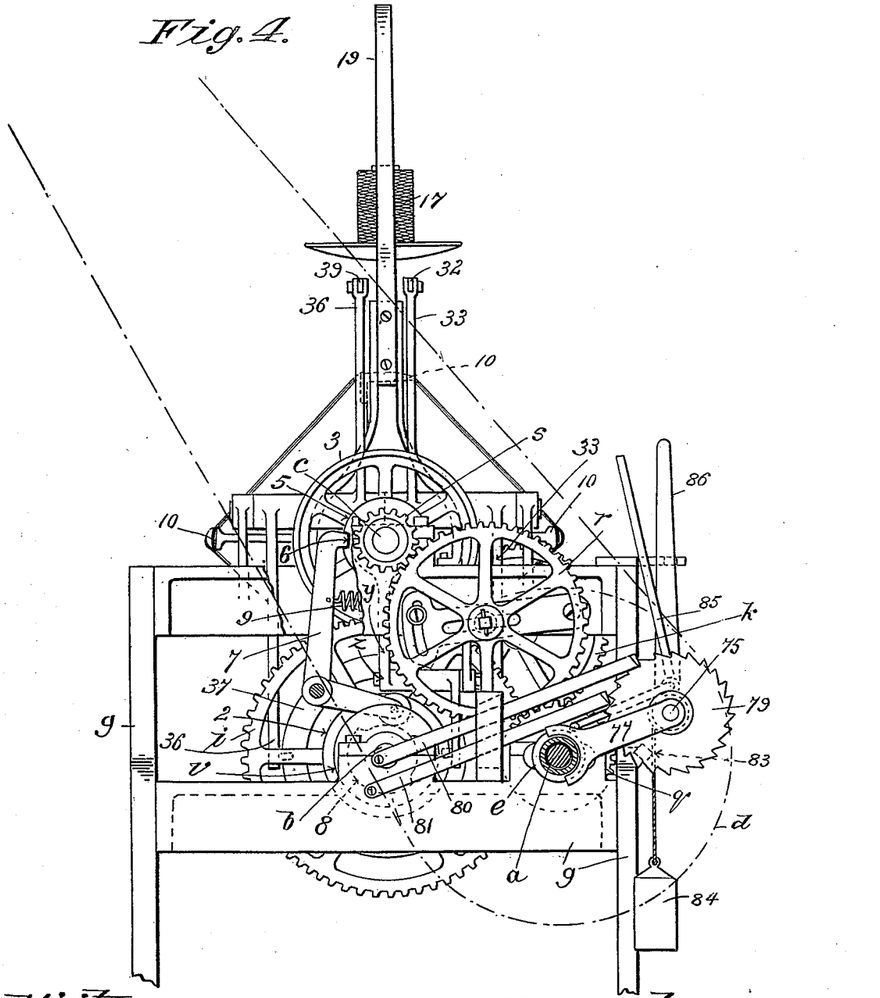
Fig. 4 is a rear elevation of the machine.
Figure 11:
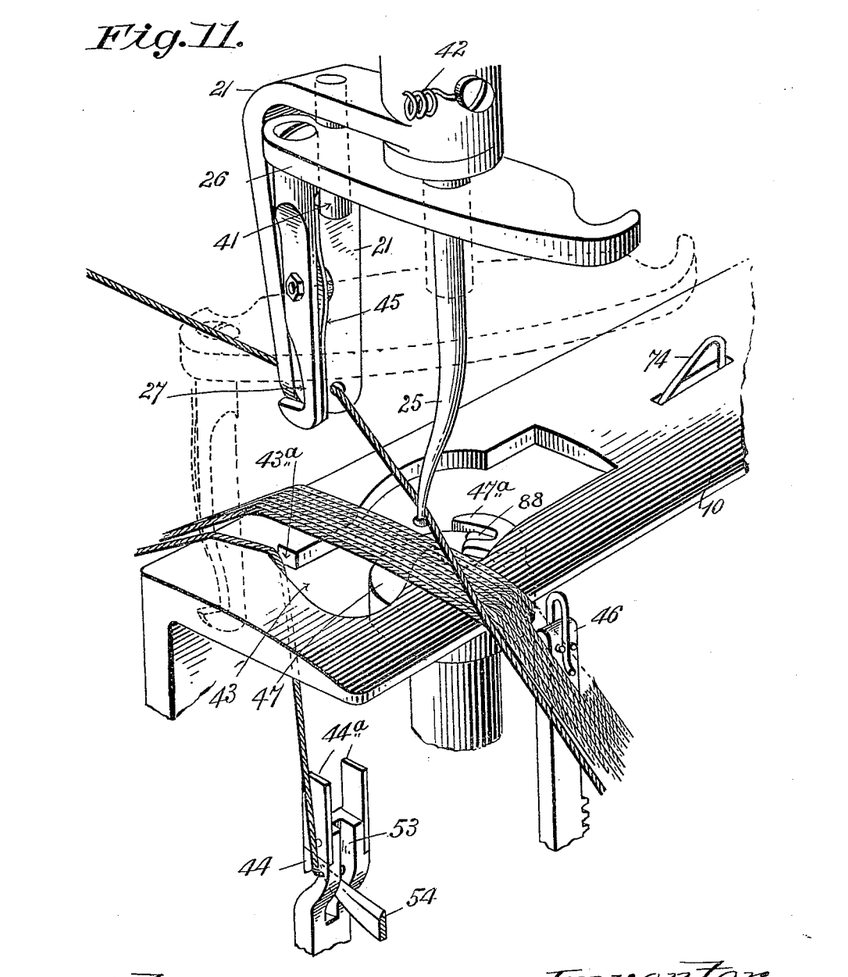
Fig. 11 is a perspective view of a part of one arm of the reel and of certain of the looping and tying devices in their position at the commencement of the looping operation.
Figures 12, 13, 14:
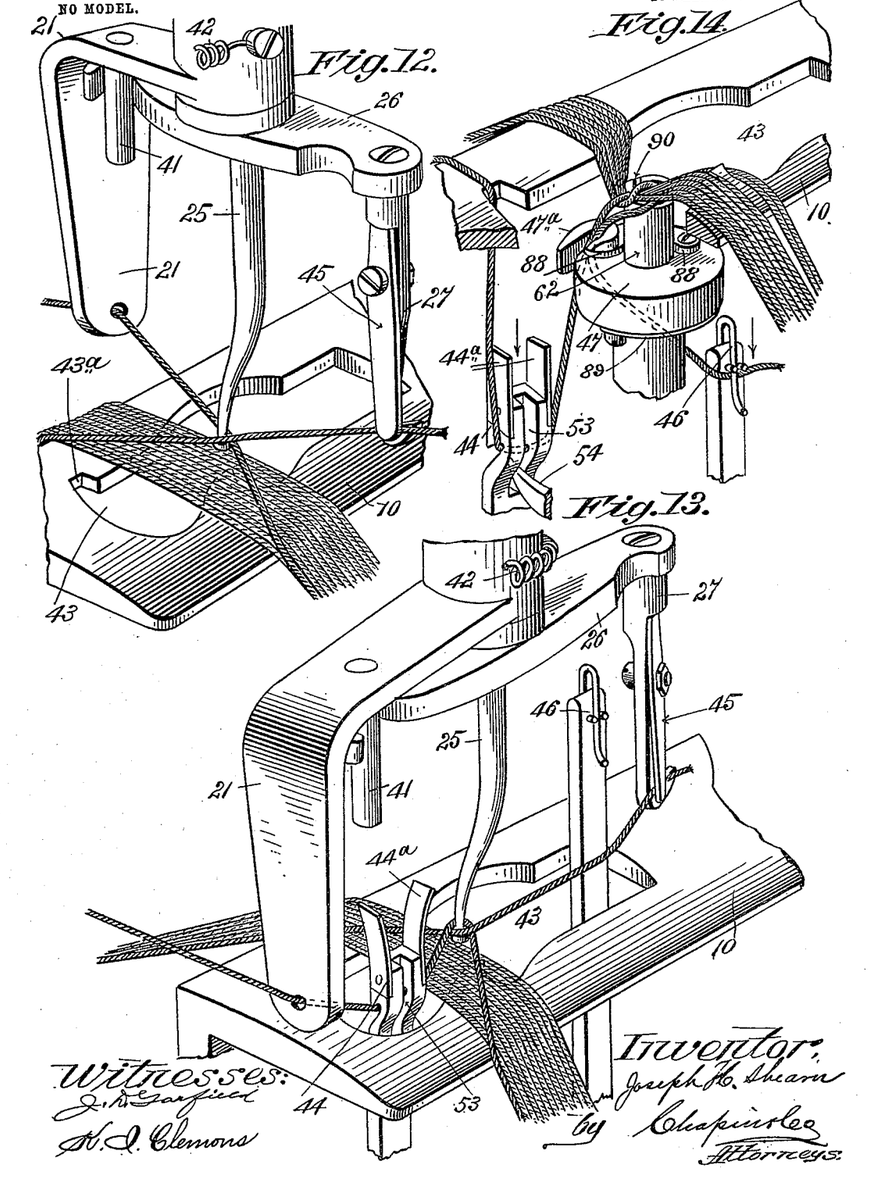
Fig. 12 is a similar view showing the position of the parts at the time the crossing of the threads over the skein is nearly completed.
Fig. 13 shows the position of these parts, the threads having been crossed and being about to be drawn down each side of the skein to be looped and tied therearound.
Fig. 14 shows the position of the parts after the looping operation and at the beginning of the knot-tying operation.

Operatively engaging the gear $q$ is the clutch member $t$ on the driving-shaft $a$, which is thrown into and out of clutch with said gear by an arm $u$, which, as shown in Fig. 2, is operated by the cam $v$ on the shaft $b$. Whenever this clutch $t$ is in engagement with the gear $q$, the reel, which is located on the extreme right-hand end of the shaft $c$, will be rotated. These cams $v$ and $p$ are so timed that the reel may rotate a given number of times to make a skein of the desired length when the motion of the reel-shaft is arrested, and the clutch member $n$ is then thrown into connection with the gear $j$ and the cam-drum $m$ is then rotated independently to operate the knot-tying mechanism. This being accomplished, the clutch member $n$ is moved out of connection with the gear $j$ and before the clutch $t$ is thrown into connection with the gear $q$. The continued rotation of the driving-shaft and cam-shaft while the reel-shaft $c$ is at rest operates to move the skein just wound from the position in which it was laid on the arms of the reel to a point farther along on said arms toward the end of the latter, thus making room for another skein, which will be wound in the same place on the reel. This movement is accomplished by making the reel-shaft in two telescoping portions, the inner one of which is indicated by $w$, Fig. 1, which extends nearly through the tubular portion. On the latter is a collar $x$, slidable thereon. This tubular shaft is longitudinally slotted at that portion thereof over which said collar moves, and a pin passing through the collar and said slot is fixed on the inner portion $w$ of the shaft $c$. Thus the movement of the collar on the shaft $c$ will cause the inner member $w$ to move longitudinally thereof. Said shaft $w$ is provided at its outer end with suitable devices whereby the finished skeins are pushed along on the arms of the reel, as will be described farther on. As stated, the time of this movement of the collar $x$ is between the unclutching of the member $n$ and the movement of the clutch $t$ to engage it with the gears $q$, and it is effected by the arm $y$, pivotally supported at $z$, whose lower end engages the cam 2 and whose upper end is forked and engages the collar. The requisite movement having been given to the inner member $w$ and said member having been drawn again within the shaft $c$, the clutch $t$ then moves into engagement with the gear $q$, and the reel-shaft is rotated the proper number of times to make the skein of desired length, upon the completion of which the cam $v$ throws out of engagement said clutch $t$, and the movement of the reel is arrested. As the reel rotates at a comparatively high rate of speed, it is desirable to provide means for arresting it at the proper point in its revolution to bring the knot-tying devices carried on one of the arms of the reel into their proper relation to other coöperating parts of the mechanism without imparting any shock to the moving parts of the machine. To that end the last few revolutions of the reel-shaft are imparted thereto by the frictional contact with the periphery of a wheel 3, fixed on said reel-shaft, of a segment-shaped shoe 4, covered with leather or some similar substance or material which will provide a good contact with said wheel 3. The shoe 4 is segment-shaped and, as shown in Fig. 2, is mounted on the cam-shaft $b$, alongside of the gear $i$, and is adapted to engage frictionally the periphery of the wheel 3 on the reel-shaft $c$ to drive the latter after it has ceased to be driven positively by the unclutching of the clutch member $t$, which is thrown out of engagement with the gear $q$ at or about the time said shoe comes into frictional contact with the wheel 3. The unshipping of the clutch member $t$, however, does not affect the positive rotation of the cam-shaft $b$, which runs at a much slower rate of speed. The reel, therefore, after having been positively rotated at a comparatively high rate of speed until the skein is nearly completed, has its speed so much reduced by the means above described that it may be stopped at the desired moment without any shock to the parts and without overrunning. The said segment-shaped shoe 4 is timed to effect a driving engagement with the wheel 3 in such manner that as the shoe and wheel become disengaged that arm of the reel carrying the knotting devices will have arrived at the position in which the ends of the skeins must be tied around the latter, and at this point the movement of the reel will be arrested. Fig. 2 of the drawings shows clearly the manner in which the cam-shaft $b$ is driven through the pinion $h$ and the gear $i$, as above stated. The normal revolution of the cam-shaft, however, is at a slower rate of speed than the rotation of the reel-shaft, the consequence being that when the wheel 3 comes in contact with the shoe 4 the first effect is to somewhat retard the reel-shaft, then to continue the rotation thereof at a rate of speed uniform with that of the cam-shaft. At the time that that arm of the reel having the knot-tying devices arrives at the point in its revolution at which it must be stopped the wheel 3 runs off from the end of the shoe 4 and the reel comes to a stop without overthrowing. The shoe 4 for the purpose of getting a proper bearing on the wheel 3 is made in the form of a spring, whereby this bearing may be obtained without subjecting any of the parts to undue strain. It being requisite that the reel-shaft should be held stationary while the cam-drum is being rotated to operate the knot-tying devices, means for holding this shaft stationary at that time are provided by securing a notched wheel 5 to said shaft, (an edge view of which is shown in Fig. 1 and a face view of which is shown in Fig. 4,) the notch 6 in which is adapted to be engaged at the proper time by an elbow-lever 7, pivotally supported on the frame, the short arm of which gages a cam 8. (Shown in dotted lines in said Fig. 4 and an edge view of which is seen in Fig. 1.) Said cam 8 is so timed that as that one of the arms of the reel which carries the knot-tying devices arrives at a vertical position over the reel-shaft $c$ on its last revolution the upper hooked end of the elbow-lever 7 is swung in toward the wheel 5 in position to engage the notch in the latter, said elbow-lever being held in engaging position with said wheel and in contact with its cam by a spring 9. Just before the reel-shaft $c$ is brought to a stop, as described, the clutch member $t$ is thrown out of engagement, the driving-shaft $a$ continuing its revolutions and driving the cam-shaft frictionally, as described above. Then at the proper time the clutch member $n$ is thrown into engagement to effect the rotation of the cam-drum $m$ after the reel-shaft has been locked stationary, as described. It is during this period that the end of the preceding skein is caught up and crossed over the top of the skein in one direction, while the end of the skein just wound is crossed over the skein in the opposite direction, both ends being ready to be caught and looped around the skein and tied. This operation is shown in Figs. 11 and 12. This thread-crossing, looping, and end-tying mechanism will now be described.

Figure 5:
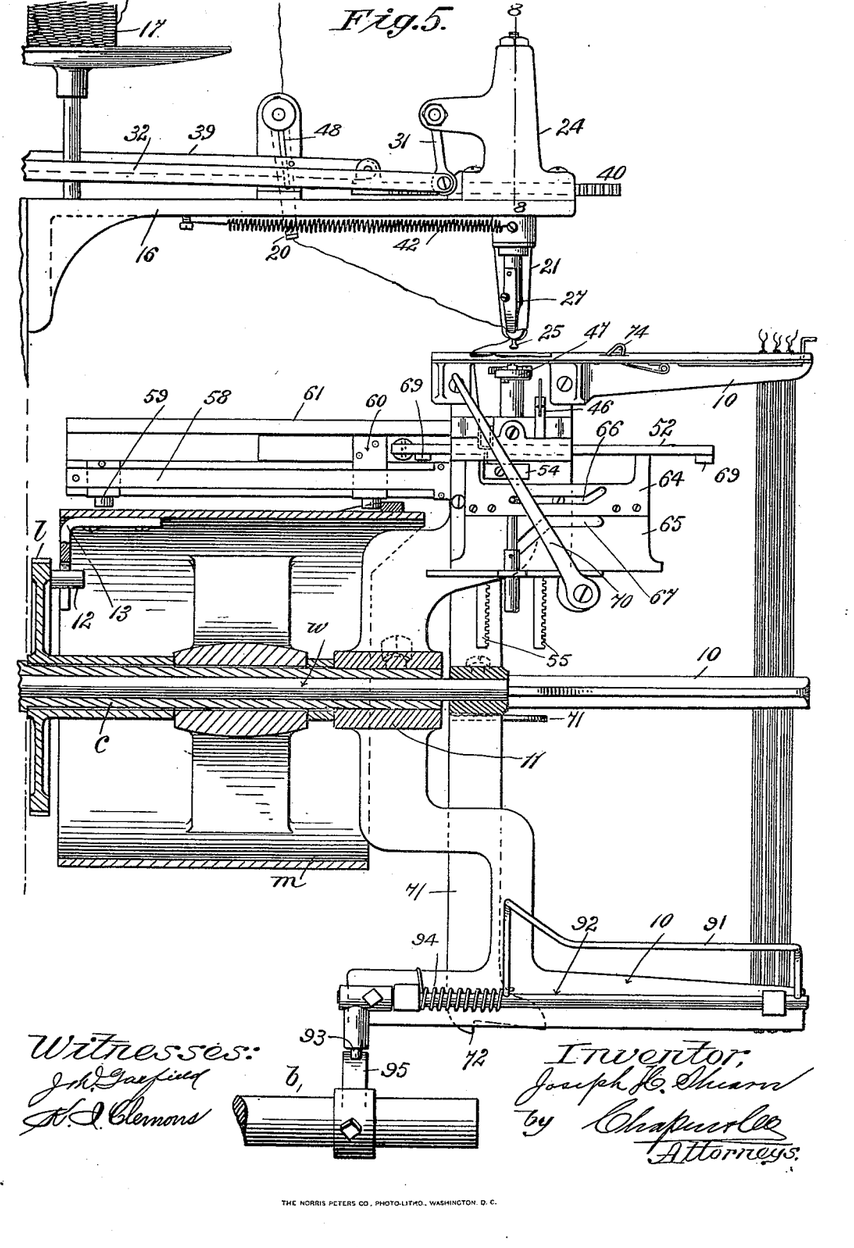
Fig. 5 is a side elevation, partly in section, on an enlarged scale, of the reel and of the thread looping and tying devices and their operating mechanism.
Figures 6, 7, 8:
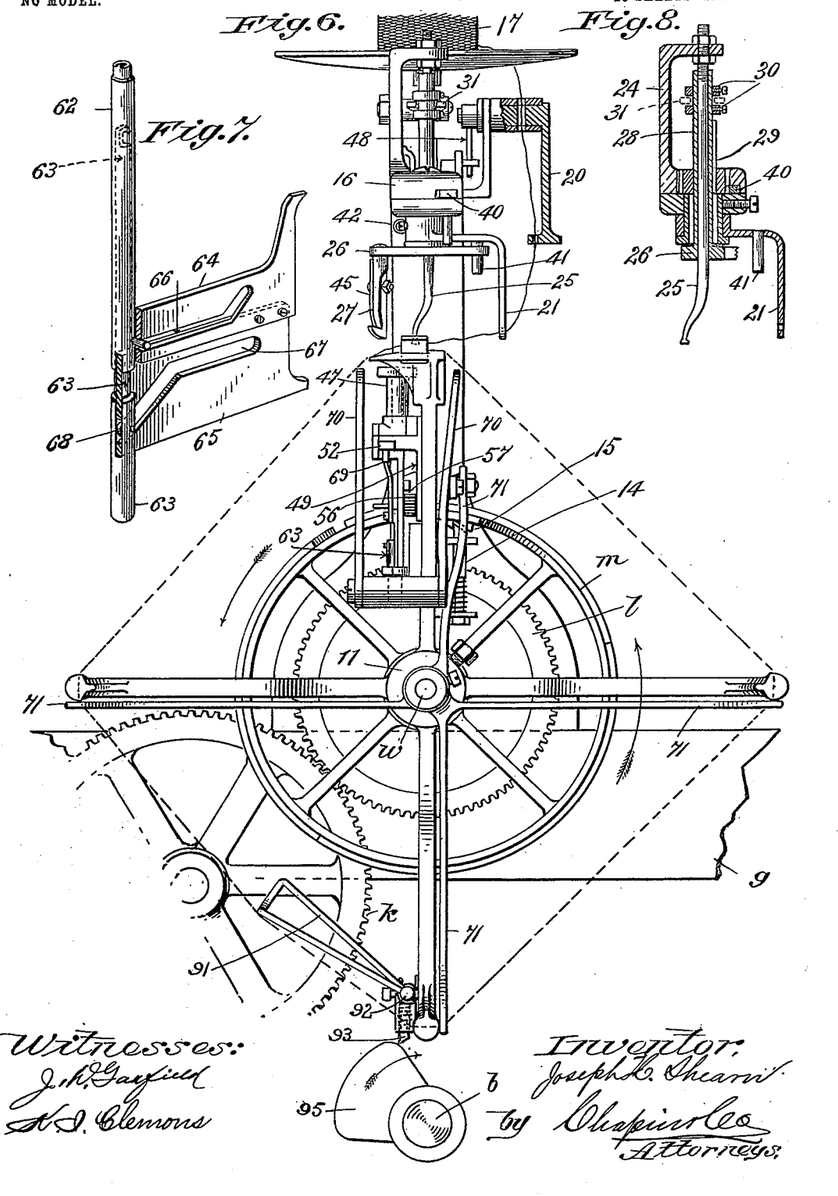
Fig. 6 is an end elevation of the parts shown in Fig. 5.
Fig. 7 is a detailed view of a part of the tying devices and their operating-cams.
Fig. 8 is a vertical section substantially on line 8 8, Fig. 5.
Figure 9:
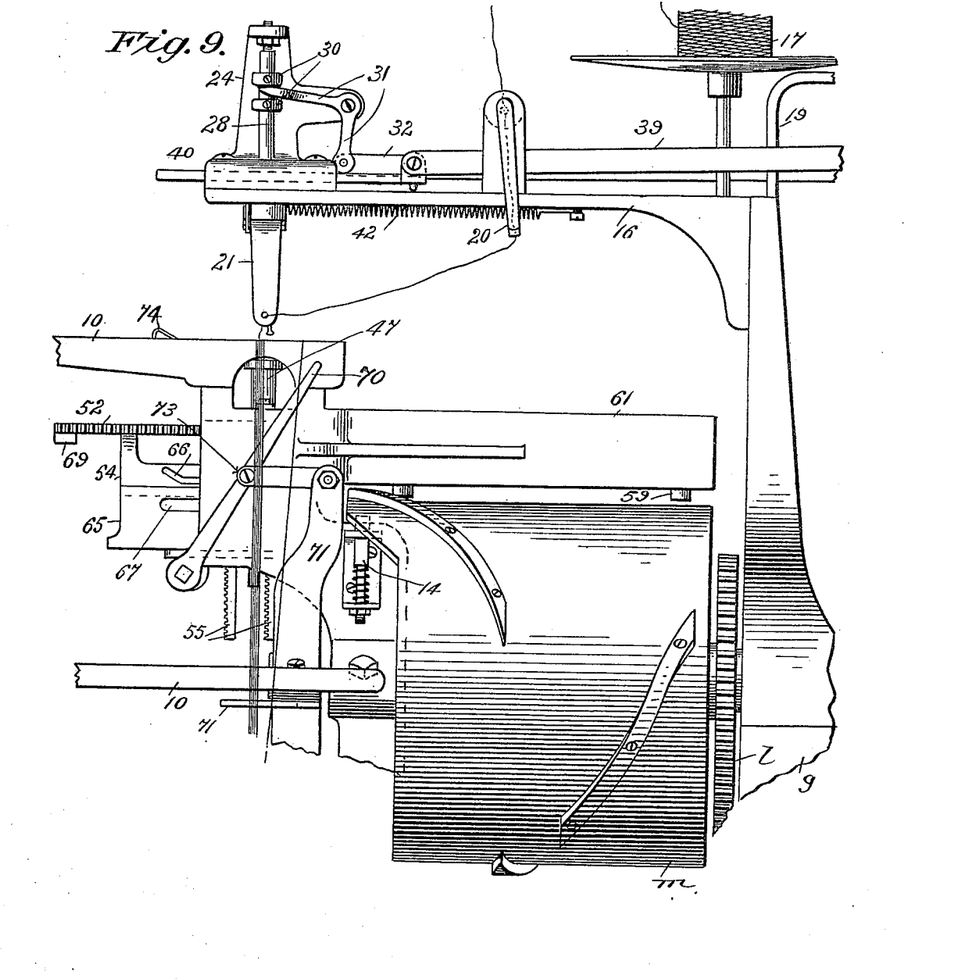
Fig. 9 is a side elevation of the parts shown in Fig. 5 looking from the opposite side thereof.

By referring to Figs. 5 and 6 it is seen that the reel proper consists of four arms 10, united by a hub 11, which is secured by a set-screw to the end of the tubular reel-shaft $c$ within the end of the cam-drum $m$, the latter being freely revoluble on said reel-shaft and connected with the gear $l$, by which it is driven, by a pin 12, engaging a forked arm 13, secured to the drum, all as clearly shown in Fig. 5. During the reeling operation the drum and the reel are locked together by a spring-latch 14, (shown in Fig. 6,) engaging a suitable projection 15 on the inside of the drum, said latch being supported on that arm of the reel which carries the knot-tying devices. This reeling operation, as stated, is effected by the engagement of the clutch member $t$ with the gear $q$ while the clutch member $n$ is disengaged, thus permitting the gears $j$, $k$, and $l$ to be rotated freely by the engagement of the gear $l$ with the drum. When the reeling operation is completed and the reel-shaft held stationary, as described, the clutch member $n$ is then thrown into engagement with the gear $j$, and the drum rotating in the direction of the arrows, Fig. 6, the projection 15 will easily pass over the end of the spring-latch 14, the parts being suitably beveled for this purpose. Assuming now that the reeling operation has been completed, the parts of the thread-crossing devices will be in the position shown in Fig. 11, and these devices are constructed as follows: Directly over the reel-shaft $c$ is supported an arm 16, on which is a cop of thread 17, the end of which passes through a guide 18 and an eye in the end of an arm 19, on which said guide is supported, thence through a swinging tension-arm 20, (shown in detail in Fig. 6,) and from said arm through the end of an arm 21, rotatably supported on a hub from the under side of the forward end of the arm 16 and adapted to be reciprocally rotated in a horizontal plane in one direction against the tension of a spring, by which it is retracted. (Best shown in Fig. 5.) Supported in a bracket 24 on the upper side of the arm 16 is a fixed depending finger 25, whose lower curved end (provided with a small spherical head) is located substantially over the longitudinal center of that arm of the wheel which carries the tying devices when the reel is at rest and also substantially over the longitudinal center of the wound skein before the latter is tied up. The function of this finger is to serve as a fixed point around which the two ends of the thread are passed when they are crossed over one another prior to being looped around the skein, as shown in Fig. 13. On this finger 25, as shown in Fig. 8, there is supported a cross-head 26, on one end of which is a hook 27, depending therefrom parallel with and swinging on a shorter radius than the arm 21. This cross-head is provided with a long hub 28, having a splined connection with a pinion 29, supported in the base of the bracket 24, the upper end of the hub having collars 30 thereon, between which the forked end of an elbow-lever 31 engages. This lever is shown in Figs. 5 and 6 and is supported on the bracket 24. The downhanging end of said lever has connected therewith a bar 32, which extends back to a vertically-swinging lever 33, (shown in Fig. 1,) whose lower end engages a cam 34, being held in contact there by a spring 35. By means of this mechanism the cross-head 26 has imparted thereto a vertical reciprocating movement through the pinion 29 on the finger 25. Located alongside of the swinging lever 33 is a second lever 36, swinging on the same axis and engaging a cam 37, being held in contact therewith by a spring 38, all shown in Fig. 1. Extending forwardly from this lever 36 is a connecting-bar 39, parallel with the bar 32 and connected at its farther end with a sliding rack 40, which engages the pinion 29. On the arm 21 is a downwardly-projecting pin 41, adapted to be engaged by the ends of the cross-head 26, whereby said arm 21 may be given a rotary motion in one direction positively against the tension of a spring 42, which serves to move it in the opposite direction.

Referring now to Fig. 11, it is seen that the end of the thread coming from the bobbin passes through the arm 21, and the end of the last preceding skein is drawn down through an opening 43 in the arm of the reel by a hook 44. The purpose of drawing off to one side the end of the thread engaged by the hook 44 is to leave an opening between that thread and the rest of the skein through which the end of the hook 27 may pass down, as shown in dotted lines, to pick up this end and draw it out from the hook 44, the latter being provided with means to be described farther on for yieldingly gripping said thread. The skein having been completed, the initial step of the thread-crossing movement is made by the cross-head 26 swinging from the position shown in Fig. 11 in full lines to that shown therein in dotted lines—that is to say, it makes a partial rotation by means of the rack 40, then a downward and upward movement by means of the elbow-lever 31, then a further rotation to the position shown in Fig. 12, at which point the cross-head 26 engages the arm 21, the two parts then moving in unison to the position shown in Fig. 13, which leaves the two ends of the skein crossed with each other and lying transversely of the wound skein. It will be observed that the hook 27 is provided with a spring-arm 45, so arranged that as the arm swings around it will draw the thread which it has picked up under the end of said spring-arm, which will grip it tightly enough to draw it out of the hook 44. The parts having arrived at the position shown in Fig. 13, the bobbin end of the thread and the free end thereof have been swung around the lower end of the finger 25 from opposite sides, and thus crossed the end of said finger serves as a point of resistance for effecting this crossing without bringing undue tension on the skein. At about the time the parts of the thread-crossing devices arrive at the position shown in Fig. 12 the hooks 44 and 46 are operated and are brought up through the opening 43 in the arm of the reel in such position that when the parts arrive at the position shown in Fig. 13 and come to a stop the bobbin end of the thread will have been drawn under the hook 44 and the free end in position to be engaged by the hook 46. In this figure the hook 44 is shown as having just begun its downward movement after having picked up the thread. This hook descends slightly in advance of the hook 46 in order to draw the skein a little to one side of the center of the tying-head 47, as shown in Fig. 14.

Figure 10:
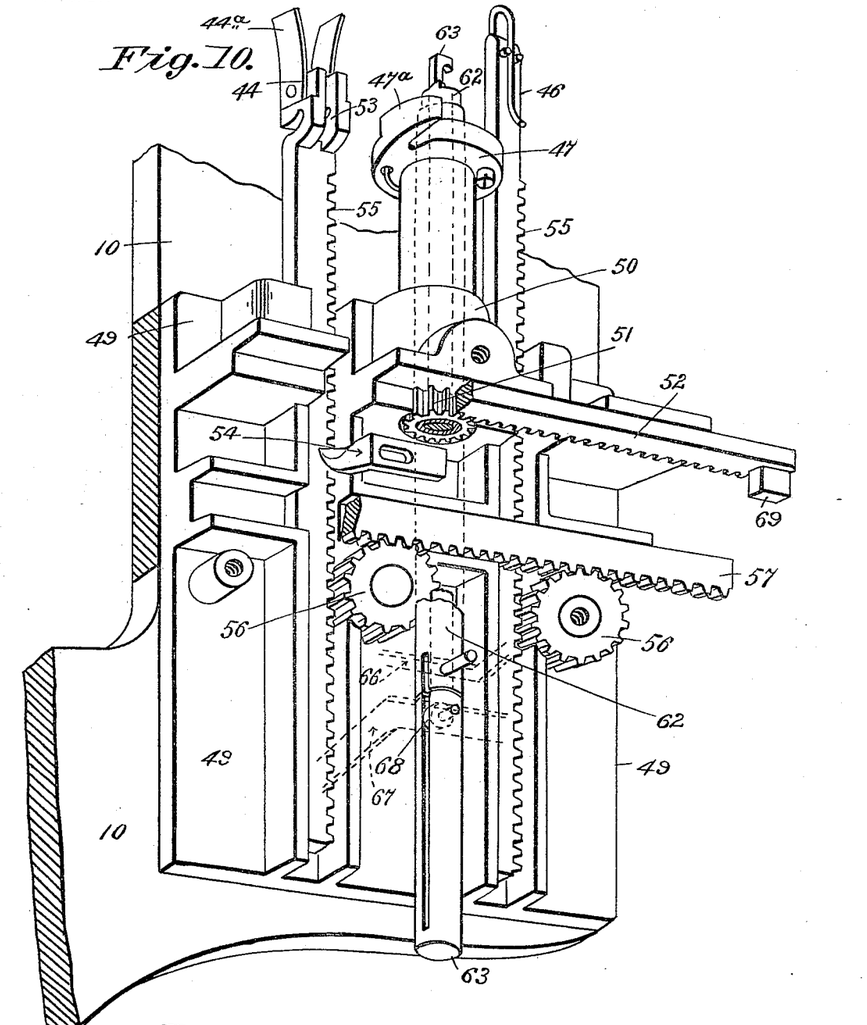
Fig. 10 is a perspective view, considerably enlarged, of the thread looping and tying devices and their operative mechanism, some of the parts being broken away and some removed.

Just prior to the arrival of the thread-crossing devices to the position shown in Fig. 13 the rearward movement of the bar 39, which rotates the arm 21, causes the tension-arm 20 to swing rearwardly by coming in contact with the depending pin 48 on the hub of said arm 20, whereby a bight is put upon the thread which passes through holes in the arm and its support, which normally are in registration. By this means when the hooks 44 and 46 begin their downward movement the tension is taken off from the bobbin end of the thread entirely, thus permitting the skein to be drawn off a little to one side, as described, and the thread looped tightly therearound. Before the hooks reach the limit of their downward movement the arm 21 and the hook 27 begin their return movement and at the same time, by reason of the forward movement of the rack 40, the bight on the thread is released. It will be seen as the hook 44 begins its descent, as shown in Fig. 13, just prior to the time that the arm 21 begins its rearward movement, that when this arm swings back again it must carry the thread around close to the end of the opening 43 and into the recess 43$^a$, which insures the separation of this end of the thread from the rest of the skein. This end at the beginning of the reeling operation running directly to the cop 17 or bobbin has been called the "bobbin" end. As the hook 46 descends it draws the free end of the thread out from under the spring-arm 45, both hooks coming to a state of rest in substantially the position relative to the arm of the reel that is shown in Fig. 11. The means for operating these hooks and for severing the bobbin end of the thread and for retaining yieldingly the end of the thread in engagement with the hook 44 in the position shown in Fig. 11 will now be described and reference may be had principally to Fig. 10 of the drawings. This figure is a considerably enlarged view of a portion of that arm of the reel which carries the knot-tying devices, and to adapt this arm to its various functions it is made somewhat broader on top and heavier than the other arms of the reel. A plate (indicated by 49) is secured to the side of this arm 10 in any suitable manner, as by screws, and on this plate is carried the knotting head 47, the two hooks 44 and 46, and the devices for operating said head and its component parts and for imparting to said hooks their requisite vertically-reciprocating movements and to said head its proper rotary movements. In principle of operation the head 47 and the parts operating therein are constructed substantially according to my prior United States Letters Patent, dated August 16, 1881, numbered 245,667, for a knotting machine, such differences as exist in this construction being due mainly to the adaptation of the tying-head to this particular machine. The head 47 is mounted in a suitable bearing in the plate 49 in a boss thereon, (indicated by 50,) the lower end thereof projecting through this boss and being provided with a gear 51, secured thereon.

By referring to Fig. 5 the parts of the knot-tying devices will be seen in the position which they occupy at the moment the skein is finished and before the operation of the thread-crossing devices, which have been described. In that figure and in Fig. 10 it is seen that this position leaves the rack 52, which engages with the gear 51, in a forwardly-extending position, in which it was left at the completion of the knotting operations performed on the preceding skein. This rack is supported in suitable ways in the plate 49 and has imparted thereto a reciprocating endwise movement by means of the cam-strips on the cam-drum $m$. During the thread-crossing operations this rack is retracted by the rotation of said drum, thereby rotating the head 47 backward and leaving it in position to be rotated in the opposite direction after the threads have been drawn down in the crossed position. (Shown in Fig. 14.) When the hook 44 descends and the thread is cut, the entire end thereof, including the two outwardly-curved spring-plates 44$^a$, are drawn in between the sides of the rectangular grooves in which the rack-provided end of the hook moves, and as the threads, as shown in Fig. 14, extend upwardly along the side of these spring-plates they are pinched between the latter and the walls of said groove at the time the thread is cut. By this means the bobbin end of the thread is secured to the reel, and the opposite end, held by the other spring-plate, is one of the two which is knotted around the skein, the last-named thread being pulled out from beside said spring-plate by the hook on the tying-head 47, and the bobbin end is drawn out from under the other of said spring-plates at the beginning of the thread-crossing operation by the hook 27. By the rotation of the head when the rack 52 moves outwardly said head 47 picks up these threads, as described, and draws them out of the hooks 44 and 46, the bobbin end of the thread having been previously cut as it is drawn down by the hook 44. This cutting is effected as follows: The top of the arm in which the hook 44 is made is offset, as shown in Figs. 11, 13, and 14, and has a vertical slot 53 in said offset end which extends to a point where the hook is formed entirely through the arm. Thus the thread when in the hook is stepped across this slot, and the downward movement of the hook carries this part of the thread extending across the slot 53 over the edge of a knife 54, secured on the plate 49, which knife is clearly shown in Fig. 10 and a portion of it in Fig. 11. The hooks 44 and 46 extend in suitable ways transversely across the plate 49 and are each provided with a rack 55 along one edge thereof, which is engaged by pinions located in the same horizontal plane, rotatably supported on said plate 49 and indicated by 56. A rack 57, suitably supported on the plate for endwise motion thereon, engages both of these pinions 56, this rack being attached to a slide 58, having a stud 59 thereon for engagement with the cam-strips on the drum $m$. The rack 52 is similarly attached to a slide 60, both of these slides 58 and 60 moving in suitable ways in a plate 61, likewise attached to that arm of the reel carrying the tying devices. The slide 60 is also provided with a stud similar to 59 for engagement with the cam-strips on the drum.

Figure 15:
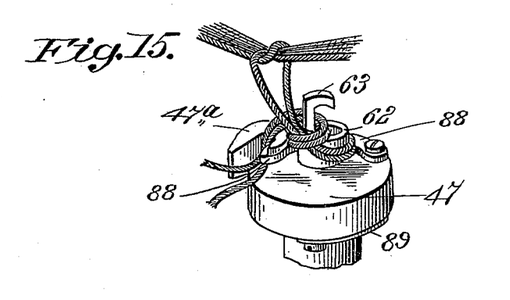
Fig. 15 shows the completion of the knot-tying operation and the position of the tying-head and its parts at this time.
Figure 16:
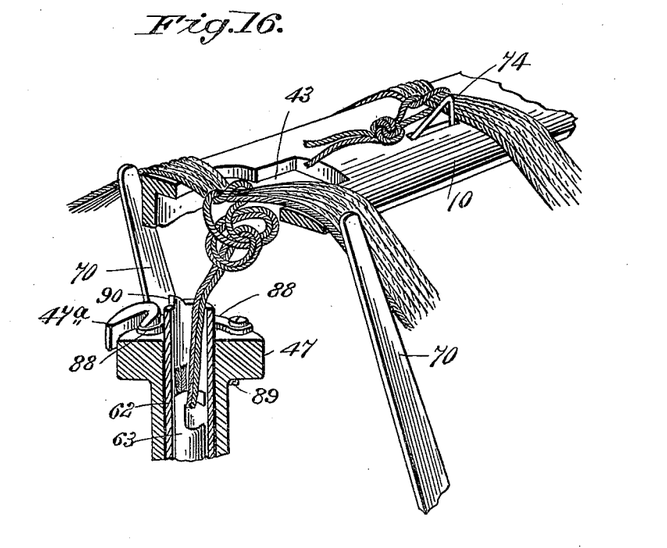
Fig. 16 shows the position of the parts at the moment the completed skein is shifted on the arms of the reel and the completed knot is drawn up tightly.

Referring now to the knot-tying head 47, there is located centrally thereof a tubular member 62, (see Fig. 7,) around the upper end of which, as shown in Figs. 14 and 16, the two ends of the skein are carried in making the knot. Inside of this member 62 is a hook 63, said hook and said tube having vertical movements, one relative to the other and to the head 47, which latter revolves in a fixed plane. Movement is imparted to the central members of the tying-head 47 by means of the cam-plates 64 and 65, having a sliding movement on the plate 49 transversely of and parallel with the axis of the tying-head 47. In the plate 64 is a cam-groove 66, and in the plate 65 is a cam-groove 67, the former imparting vertical movements to the tubular member 62 and the latter imparting similar movements to the hook 63. The cam-plates 64 and 65 are secured together, as shown in Fig. 7, in slightly offset planes, 64 engaging with a pin on the outside of the tube 62 and the plate 65 passing through, as shown in Fig. 7, a long vertical slot in the stem of the hook 63, a roller 68, secured in said slot and in the cam-groove 67, serving to impart endwise movement to the hook 63 within the tubular member 62 as the cam-plate is moved endwise. These cam-plates 64 and 65 move as one piece and are actuated by the engagement therewith of blocks 69 on either end of the rack 52, which when said rack is actuated come in contact with the said cam-plates at the proper time to give them their required movements, whereby after one turn about the top of the tubular member 62 has been given to the end of the thread when the tube is in the position shown in Fig. 14 the hook 63 rises up out of the end of the tubular member 62 as the latter descends somewhat into the head 47, and a second turn of the tying-head brings the thread around outside of the first course, and while that first course remains on the top of the tube left projecting above the head the hook 63 begins its downward movement, drawing the second course of thread down into the tube and pulling the ends thereof out from between the jaws of the hook 47$^a$ on the head 47. Means are provided for gripping the end of the thread in the hook 47$^a$, and consist of a swinging jaw 88, pivoted to the top of the head, which is yieldingly held against the hook, as shown in Fig. 15, by a spring 89, secured to the under side of the head 47 and having an upturned end which passes through a slot in the head and engages the jaw 88.

Another feature to which attention is called is the projection 90 on the upper edge of the tubular member 62, which is clearly shown in Fig. 16. The purpose of this projection on top of the tubular member is clearly illustrated in Fig. 15. When the hook 63 starts to draw the two ends of the thread down into the tubular member 62 to complete the knot, the end of the thread which passes from the outside of the tube up over the edge thereof in a spiral course and thence through the hook 63 around into the jaws of the hook 47ª would, if not held in place by the said projection 90, be likely to slip back as the hook 63 descends, thus closing the loop before the hook 63 had passed through it. Having the projection 90 to draw against, the hook 63 in its descent is never impeded in its movement by the ends of the thread which are looped around the top of the tubular member slipping off and catching under the hook. From the position shown in Fig. 15 the descent of the hook 63 from the position shown in Fig. 16 draws the ends of the thread out of the hook 47ª and binds them between itself and the inner walls of the tube 62, and about this time the arms 70 are operated to move the skein along on the arms of the reel, and this operation, which pulls the ends of the thread out from under the hook 63 and tends to tighten the knot (which prior to this movement is but loosely formed,) is shown in said Fig. 16. At this moment the swinging arms 70, whose upper extremities lie on each side of that arm of the reel carrying the knot-tying devices, are swung toward the end of the reel to push the skein out of the way of the next succeeding skein to be wound. These arms 70 are clearly shown in Figs. 5, 6, 9, and 16. The skein is at the same time pushed along the arms of the reel by means of the four-armed frame, whose arms 71 are parallel with and in close proximity to the arms 10 of the reel and the extremities of which, as shown principally in Fig. 5, are provided with projections 72 for picking up the skein and pushing it along the arms of the reel. This pusher-frame is secured to the end of the part $w$ of the reel-shaft $c$ and is operated at the proper time by the collar $x$, arm $y$, and the cam 2. The arms 70 are actuated when said skein-pushing frame is moved by means of a short connection 73, extending from that one of the arms 71 which lies under the knot-tying devices to the arm 70, said last-named arm 71 being shorter than the others, its functions being performed by the two arms 70.

A spring-latch 74 (shown in Figs. 9, 11, and 16) is located in that arm of the reel carrying the tying devices in such position that the arms by which the finished skeins are moved toward the end of the reel-arm will be forced over the top of said latch out of the way of the succeeding skein.

A stop-motion for the machine is provided whereby when a given number of skeins have been made on the machine it may be brought to a stop and is a stop-motion and shipper-rod combined, and it consists in a shaft 75, (shown in Figs. 2 and 3 in side elevation and in end elevation in Fig. 4,) which is adapted to have an endwise sliding movement in its bearings 76. On the end of this shaft near the driving-wheel is a forked arm 77, which engages the hub of said wheel, having projections thereon for engagement with the clutch member $e$, pinned to the shaft $a$. On said shaft is a ratchet-wheel 79, and a pawl-lever 80 engages the teeth of said ratchet, said lever being actuated by an eccentric connection with the end of the cam-shaft $b$. Said ratchet is also provided with a locking-pawl 81, pivoted on the frame. (All shown in Fig. 4.) A spring 82 is located on the shaft 75 between one of the bearings 76 and the collar on the shaft and normally holds the driving-pulley in engagement with the clutch $e$. On said ratchet-wheel is a cam projection 83, which after making a full revolution comes in contact with a part of the frame, and thereby imparts endwise movement to the shaft 75, disengaging the driving-wheel from the clutch $e$ by means of the forked arm 77. This rotation of the ratchet-wheel 79 winds up on its hub a weight 84, attached thereto by a cord. To start the machine, the pawl-lever and the locking-lever 80 and 81 are first thrown out of engagement with the ratchet-wheel 79 by a trip-rod 85, supported in hubs secured to the shaft, one end of said rod being upturned in convenient proximity to a shipping-lever 86, which is loose on the shaft 75, but may rotate thereon within the limits of a slot having two steps therein in a plate 87, secured to the frame of the machine. When the spring 82 has operated to throw the driving-wheel out of the clutch member $e$ and stop the machine, if the lever 86 is swung to the position shown in Fig. 3 the machine cannot then be started; but when said lever is swung over opposite the deeper portion of the slot in said plate said spring 82 may then force said shaft 75 toward the front of the machine, bringing the driving-wheel again into connection with the clutch 78. The machine may be stopped at any time by forcibly pushing the shipper-rod in the direction of the driving-wheel to effect the disengagement of the latter from its driving-clutch. This is only one type of a stop-motion, of which there are a number which would be equally effective and which might be substituted for this one, if desired. The stop-motion *per se* forms no part of the present invention.

In Figs. 5 and 6 there is shown means for stretching out the skeins more or less after they are tied, which serves to straighten the strands and at the same time to draw the looped ends of the skein tighter around the latter and to straighten the skein out just as would be done by hand. In the absence of this device the skeins will also crawl endwise more or less on the arms of the reel, and the knots of the different skeins therefore would not all occupy the same position relative to the arm of the reel on which they were tied, and this would delay an operative greatly in tying up the bunch of skeins on the reel in such manner as to bring all of the tied ends within the knot of the bunch. The means referred to consist of a frame 91, supported on a rock-shaft 92 on one of the arms 10 of the reel. On the end of said shaft there is secured a short arm 93, and coiled around the shaft is a spring 94, so arranged that when the arm 93 is tripped the frame will be swung back against the tension of the spring, the release of said arm permitting the frame to be swung sharply outward against the inside of whatever skeins there may be on the reel-arm that have been finished, the end of the frame lying next to the skein being wound being backwardly bent, as shown in Fig. 5, to the end that this skein may not be struck by the frame. Means for tripping the arm 93 are provided in the cam 95 on the end of the cam-shaft $b$, which projects outside of the frame more or less under the reel. This cam is so located that during the reeling operation its periphery will slowly pass through the path of rotation of the arm 93 in the same direction. The arm, however, on the reel traveling faster than the cam 95 causes the frame to be tripped several times during the passage of the cam. It has also been demonstrated in practice that unless this stretching of the skeins is effected and the latter held under more or less tension the first few skeins to be tied are liable to become untied during the reeling and tying of the skeins.

Having thus described my invention, what I claim, and desire to secure by Letters Patent of the United States, is—

1. In a machine of the class described, means for reeling a skein of desired length, combined with devices for looping the two ends thereof around the skein, and devices for knotting said ends, substantially as described.

2. In a machine of the class described, the combination with a reel, of means for looping the two ends of a skein around the latter; knot-tying devices, and means for operating those devices when the reel is stationary, to tie the ends of the skein together.

3. The combination in a machine of the herein-described class of a reel, a bobbin for holding a quantity of thread to be reeled into skeins, and means on the reel for holding the first strand of a skein in separated relation to the other strands of the skein, together with knot-tying devices and means for picking up said separated strands in advance of the operation of the knot-tying devices.

4. In a machine of the class described, a bobbin for holding a quantity of thread to be reeled into skeins, a reel, means on the reel for holding the first strand of a skein in separated relation to the body of the skein; means for crossing said first strand and the last strand of the skein, combined with devices for looping said crossed strands around the skein, and knot-tying devices for forming a knot in said strands, substantially as described.

5. In a machine of the class described, means for reeling a skein of a desired length; devices for looping the two ends thereof around the skein, mechanism for knotting said ends, and a combined counting device and stop-motion whereby the machine is stopped when a certain number of skeins have been tied, substantially as described.

6. In a skeining-machine of the class described, means for reeling a skein of a desired length, a device for looping the ends of the skein around the latter, and another device for tying the two ends together, combined with means for shifting the completed skein from the position it occupied during the reeling operation.

7. In a machine of the class described, a bobbin for holding a quantity of thread to be reeled into skeins, a reel, means on the reel for holding the first strand of a skein in separated relation to the body of the skein; means for crossing said first strand and the last strand of the skein, combined with devices for looping said crossed strands around the skein and devices for putting a tension on the last strand of the skein during the looping operation, substantially as described.

8. The combination in a machine of the class described, of a driving-shaft, a reel-shaft, a reel on the latter, thread-looping and thread-tying devices carried on the reel, mechanism on the reel-shaft for operating said looping and tying devices, and connections between the driving-shaft and reel-shaft for rotating the reel, and said mechanism thereon, as one piece, and for operating said mechanism when the reel is at rest, substantially as described.

9. The combination in a machine of the class described, of a driving-shaft, a cam-shaft, and a reel-shaft, and connections between said shafts whereby during the reeling operation the reel-shaft may be driven positively by the driving-shaft during a part of said operation, and yieldingly by the cam-shaft during the remainder of said reeling operation, substantially as described.

10. In a skeining-machine of the class described, in combination, devices for reeling a skein of a desired length, devices for tying the ends of said skein around the body thereof, means for shifting said skein from the position on the reeling devices on which it was wound, and mechanism for stretching out said skein in its shifted position on the reeling devices, substantially as described.

11. The combination in a machine of the class described, of a driving-shaft, a cam-shaft, a reel-shaft, a reel on the latter, and means on the reel for looping the ends of a skein around the latter and tying said ends; a cam-drum loose on the reel-shaft, and connections between said drum and reel whereby during the reeling operation the drum may be rotated by the reel, and connections between the driving-shaft and drums whereby the latter may be rotated independently of the reel when the reel is stationary, substantially as described.

12. The combination in a skeining-machine having a suitable supply of thread, of devices for reeling a skein of desired length therefrom, devices for crossing the first and the last strands of said skein before severing the said last strand extending to said supply, means for looping said strands around the skein, and means for severing said last strand during the looping operation and for holding fast the end extending to said supply during the movement of the other end by said looping devices, substantially as described.

13. In a skeining-machine, reeling mechanism for forming a skein of a desired length, suitable devices for crossing the two ends of the skein and locating them in a position transversely thereto, a knot-tying head, hooks adapted to grasp said crossed ends and move them into position to be operated on by said head, and mechanism for actuating said thread-crossing and looping devices, and said knot-tying head, substantially as described.

14. In a machine of the class described, a suitable reel on which a skein of desired length may be wound; devices for crossing the first and last strands of said skein over the top of the latter substantially at right angles thereto; a knot-tying device located beneath the skein, mechanism for drawing down said strands one on each side of the skein into position to be grasped by said tying-head, and means for operating the latter, substantially as described.

15. In a machine of the class described, suitable reeling mechanism, means for looping the first and last strands of a skein around the latter, a knot-tying device for knotting said ends, devices for yieldingly holding the ends of said strands in the tying device, and mechanism for shifting the position of the skein on the reeling mechanism, whereby the knot in said ends may be drawn tight, substantially as described.

JOSEPH H. SHEARN.

Witnesses:
S. A. EWING,
FRANK C. GRAVES.